(No Model.)
H. H. TRENOR.
TOOL HEAD EYE.
No. 306,192. Patented Oct. 7, 1884.
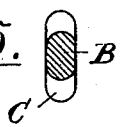
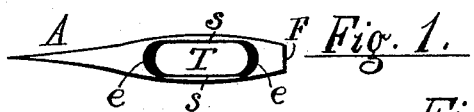
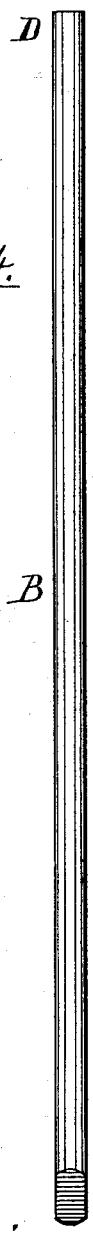
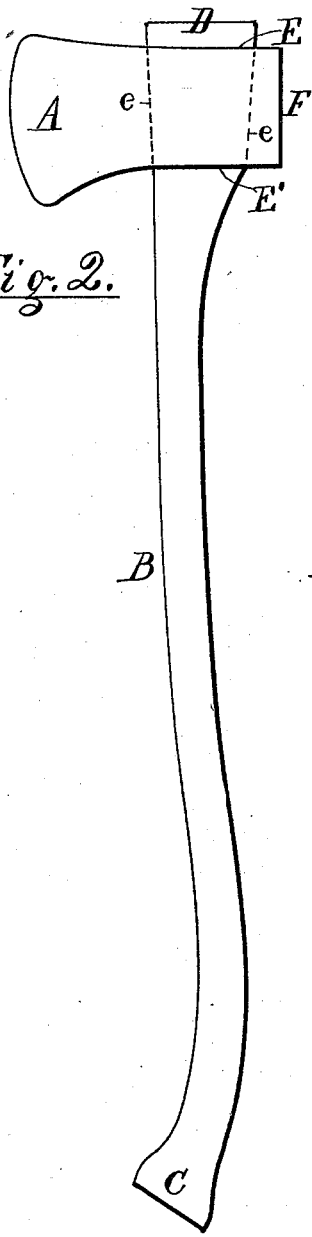
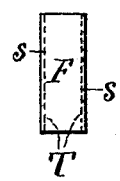
Attest.
Henry J. Theberath.
L. Lee.
Inventor
H. H. Trenor, per
Thos. S. Crane, Atty.

UNITED STATES PATENT OFFICE.

HENRY H. TRENOR, OF NEW YORK, N. Y.

TOOL-HEAD EYE.

SPECIFICATION forming part of Letters Patent No. 306,192, dated October 7, 1884.

Application filed March 27, 1884. (No model.)

*To all whom it may concern:*

Be it known that I, HENRY H. TRENOR, a citizen of the United States, residing in the city, county, and State of New York, have invented certain new and useful Improvements in Tool-Head Eyes, fully described and represented in the following specification and the accompanying drawings, forming a part of the same.
This invention consists in the combination, with an ax or other tool head, of an eye having parallel sides and tapering ends; and the object of the invention is to adapt the head for use with a handle of uniform thickness throughout, such as I have made the subject of a separate patent application, No. 122,396, filed February 28, 1884. I have heretofore claimed in my patent application No. 122,600, allowed to me March 19, 1884, an eye with tapering sides and parallel ends, but have found that such construction necessitates the turning of the handle in a lathe from a thick stick of wood at an enormous waste of material, while the eye shown herein enables me to make the head of the handle of the same thickness as the haft, and thus to form the handles of planks sawed to the desired uniform thickness. Such handles can be produced with great economy by cutting them first from such flat plank with a band-saw, and then rounding their front and rear edges uniformly from end to end by an edging-cutter or revolving molding-tool, whereas the ax or other tool handles heretofore made with an enlarged butt or thickened head could only be made by reducing the haft from a stick as thick throughout as such enlargement, with a great resulting waste of the material. The form of eye claimed herein is intended for use with a handle adapted to pass entirely through the eye from its larger side until the head of the handle is jammed fast in the eye, and the handle thus held therein without any fastenings, and the shape is shown in the drawings, in which—
Figure 1 is a plan of an ax-head having my improvement. Fig. 2 is a side view of the head and handle combined. Fig. 3 is an edge view of the back of the ax-head at F. Fig. 4 is an edge view of the handle separate from the head. Fig. 5 is a section of such handle near the butt, and Fig. 6 is a plan of a head with an eye of alternative form.

A is the ax-head; B, the haft of the handle; C, the butt, and D the head of the latter. The sides of the eye are shown at s s, and the ends of the same at e e, the larger part of the eye being at the outer side of the ax-head, at E, and the smaller part of the eye at the inner side of the head, at E'.

In Fig. 2 the ends of the eye are shown converging inward, so as to form a tapering socket, T, to secure the handle without fastenings of any kind, while the sides of the eye are shown in Figs. 1 and 3 parallel, for the reasons named above. The handle shown herein is not claimed, because it is made the subject of a separate patent application, in which I have claimed the flattening of the butt, as at C, and such a handle can obviously be passed through an eye of the shape described from the outer side, the butt of the handle being shaped in all such cases so as to go through the smallest part of the eye. As the edges of the handle and its butt are rounded, as shown in Fig. 5, the ends of the eye are preferably rounded, as shown in Fig. 1, and the metal around the eye thereby connected most securely with the front and back of the ax-head. The parallelism of the sides may be retained in an eye of different contour than that just described, as is seen in Fig. 6, where the eye is shown more nearly resembling those used with the old style of wedged handles, being thinner at its front end to avoid enlarging the cheeks of the ax. A finer cutting angle is thus obtained; but the head of the handle requires to be shaped in a lathe at greater expense than the flat head shown in Figs. 2 and 4.

It will be seen from the above that certain advantages result from the use of an eye having the parallel ends; but it is also found that the punches used in forming the eyes in an ax-poll machine are much more cheaply and accurately made if having two opposite parallel sides, the parallel sides of such punches being filed away slightly toward the point to make them draw out of the hole readily, without, however, requiring any widening of the handle-head at such opposite parallel sides by reason of such taper.

I have not made herein any general claim to an eye having two parallel and two converging sides, for the reason that I have made another specific claim to such an eye having parallel ends and sloping sides in an application, No. 122,600, pending simultaneously herewith.

Having thus shown the advantages of my improvement both in the manufacture of the eye and of the handle for use therewith, I claim the same in the following manner:

The combination, with an ax or other tool head, of the oblong eye having two parallel sides, as $s\ s$, and two converging ends, as $e\ e$, and the width between the ends being greatest at the outer side of the head, as at E, so as to form a socket with parallel sides and ends tapering from the outside inward, as and for the purpose set forth.

In testimony whereof I have hereunto set my hand in the presence of two subscribing witnesses.

HENRY H. TRENOR.

Witnesses:
 THOS. S. CRANE,
 C. C. HERRICK.